(12) United States Patent
Drepper

(10) Patent No.: US 8,880,901 B2
(45) Date of Patent: Nov. 4, 2014

(54) SECURE ADDRESS HANDLING IN A PROCESSOR

(75) Inventor: Ulrich Drepper, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1247 days.

(21) Appl. No.: 11/439,943

(22) Filed: May 25, 2006

(65) Prior Publication Data

US 2007/0277024 A1    Nov. 29, 2007

(51) Int. Cl.
*G06F 12/14* (2006.01)
*G06F 9/30* (2006.01)
*G06F 9/32* (2006.01)

(52) U.S. Cl.
CPC ........ *G06F 12/1408* (2013.01); *G06F 9/30174* (2013.01); *G06F 9/3017* (2013.01); *G06F 9/322* (2013.01)
USPC ........... 713/190; 713/162; 713/187; 711/206; 711/216; 712/211

(58) Field of Classification Search
CPC ..... G06F 21/14; G06F 21/121; G06F 21/125; G06F 21/6227; G06F 9/30145
USPC .................. 713/162, 187, 190; 711/206, 216; 712/211
See application file for complete search history.

(56) References Cited

U.S. PATENT DOCUMENTS

| | | | | |
|---|---|---|---|---|
| 4,246,638 A * | 1/1981 | Thomas | ........ | 712/208 |
| 4,809,160 A * | 2/1989 | Mahon et al. | ........ | 726/4 |
| 5,790,979 A * | 8/1998 | Liedtke | ........ | 711/206 |
| 5,801,675 A * | 9/1998 | Paley et al. | ........ | 715/784 |
| 6,606,707 B1 * | 8/2003 | Hirota et al. | ........ | 713/172 |
| 7,124,274 B2 * | 10/2006 | Watt et al. | ........ | 711/202 |
| 7,694,134 B2 * | 4/2010 | Witt et al. | ........ | 713/165 |
| 7,853,803 B2 * | 12/2010 | Milliken | ........ | 713/190 |
| 7,870,396 B2 * | 1/2011 | Kamei | ........ | 713/190 |
| 2004/0165725 A1 * | 8/2004 | Kumar et al. | ........ | 380/202 |

FOREIGN PATENT DOCUMENTS

JP        2005/209108 A  *  8/2005  ............. G06F 12/14

OTHER PUBLICATIONS

Tuck et al., "Hardware and Binary Modification Support for Code Pointer Protection From Buffer Overflow", Proceedings of the 37th Annual IEEE/ACM International Symposium on Microarchitecture, Dec. 4-8, 2004, pp. 209-220.*

* cited by examiner

*Primary Examiner* — Eleni Shiferaw
*Assistant Examiner* — Paul Callahan
(74) *Attorney, Agent, or Firm* — Lowenstein Sandler LLP

(57) ABSTRACT

An embodiment generally pertains to a method of secure address handling in a processor. The method includes detecting an instruction that implicitly designates a target address and retrieving an encoded location associated with the target address. The method also includes decoding the encoded location to determine the target address. Another embodiment generally relates to detecting an instruction having an oper- and designating an encoded target address and determining a location of a target instruction associated with the target address. The method also includes determining a location of a subsequent instruction and encoding the location of the subsequent instruction. The method further includes storing the encoded location of the subsequent instruction.

23 Claims, 5 Drawing Sheets

SECURE ADDRESS HANDLING IN A PROCESSOR

FIELD

This invention generally relates to security for processors. More particularly, the invention relates to a method and system for securing the use of addresses in jump instructions.

DESCRIPTION OF THE RELATED ART

Security in computers is a serious concern. Recent attacks by the Blaster virus and other similar viruses highlight the importance of defending computer systems against malicious attacks.

One method of attacking computers is the attacker may attempt to take control of an application which is being attacked by redirecting the execution path from the original path the programmer designed to one which the attacker has designed by injecting data for the malicious new code path. Alternatively, the attacker may attempt to select the appropriate code in the existing application to achieve his goal of redirection.

One solution to preventing attacks may be to establish barriers (e.g., firewalls) to prevent malicious attackers access to these applications. However, once these barriers have been breached, the malicious attackers still have access to the application to work their mischief. Thus, a solution is needed that improves the security of the application at the processor level.

SUMMARY

An embodiment generally relates to a method of secure address handling in a processor. The method includes detecting an instruction having an operand designating a target address and determining a location of a target instruction associated with the target address. The method also includes determining a location of a subsequent instruction and encoding the location of the subsequent instruction. The method further includes storing the encoded location of the subsequent instruction.

Another embodiment generally pertains to a method of secure address handling in a processor. The method includes detecting an instruction that implicitly designates a target address and retrieving an encoded location associated with the target address. The method also includes decoding the encoded location to determine the target address.

Yet another embodiment pertains generally to a method of secure address handling. The system includes a processor configured to execute the program code and a transformation module configured to implement a reversible transformation function. The processor is configured to detect an instruction having an operand designating a target address and to determine a location of a subsequent instruction. The processor is also configured to apply the reversible transformation function of the location of the subsequent instruction and to store the encoded location of the subsequent instruction.

Yet another embodiment relates generally to a method of secure address handling. The method includes detecting an instruction that explicitly designates a target address and retrieving an encoded location associated with the target address. The method also includes decoding the encoded location to determine the target address.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments are related generally to methods and mechanisms to prevent software attacks without incurring substantially significant costs. More particularly, an address transformation module may be configured to transform target or return addresses in explicit and implicit jump instructions to an encoded target or return address. The encoded addresses may prevent hacker attacks predicated on redirecting execution flow of applications. That is, to successfully determine the encoded address, the attacker has to know the exact transformation to arrive at the encoded address. This is a small likelihood because the chance of correctly guessing the correct transformation is up tol in $2^{32}$ in a 32-bit processor or up to 1 in $2^{64}$ in a 64-bit processor.

In some embodiments, an address transformation module may be invoked by the processor when processing explicit and implicit jump instructions. More specifically, the address transformation module may be configured to take a random number (or string of bits, automatically generated or provided by an operating system) and apply a transformation to the return address of the explicit. The transformation may be required to be unique and reversible such that the transformation must map each value to exactly one other value, e.g., an exclusive-or ("XOR") operation, an addition operation, etc. The encoded or transformed address may be stored on a processor stack or an appropriate register for the processed jump or call instruction.

In other embodiments, the processor may also be configured to invoke the address transformation module when processing an implicit jump instruction, e.g., a return instruction. More particularly, the processor may retrieved the encoded address associated with the implicit jump instruction and apply a reverse transformation. The resulting decoded address is then used in the execution flow of the application.

Figure 1:
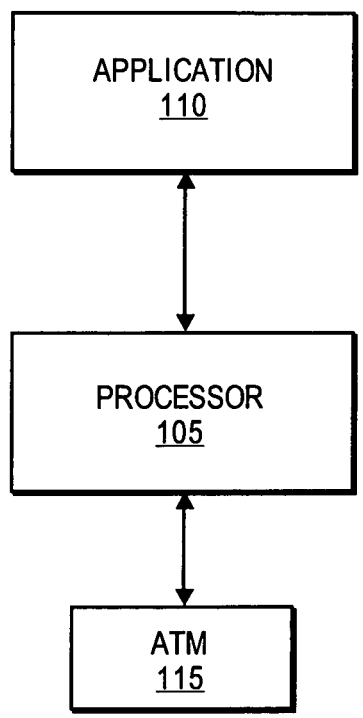
FIG. 1 illustrates an exemplary system 100 in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a processor 105, an application 110 and an address transformation module (labeled as "ATM") 115. The processor 105 may be implemented with a microprocessor manufactured by Intel, IBM, Transmeta, Linear Technology, etc. The processor 105 may be configured to execute an application 110. The application 110 may be any type of computer program software.

The system 100 also includes the address transformation module 115. The address transformation module 115 may be configured to take a random number with the resolution of the data width of the processor 105. For example, the address transformation module 115 may use a 32-bit wide random number generator for a 32-bit processor. The random number used as the transformation number might be automatically generated by the ATM or it might be chosen by the code executed by the processor 105 (e.g., by the operating system).

The address transformation module 115 may apply a transformation function based on a transformation value. The transformation value may be a chosen when the application was instantiated or invoked. For secure operation the transformation itself and the transformation value may be any type of value as long as the transformation value changes for each instance of the application. Each invocation of an application can value its own transformation value. All concurrently running applications can have independent transformation values.

The transformation value may then be used by the address transformation module 115 to transform addresses used in explicit jump instructions that dynamically compute a value to be used as the target address such as a call or jump instruction. In other embodiments, separate sub-instructions may be used to transform the content of a register according to the selected transformation and transformation value. The transformation function may be required to be unique and reversible such that the transformation must map each value to exactly one other value, e.g., an XOR operation, an addition operation, etc. The encoded or transformed address may be stored on a processor stack or an appropriate register for the processed jump instruction.

The processor 105 may also be configured to invoke the address transformation module 115 when processing an implicit jump instruction which take a value from a specific memory location and use the value as a target address such as a return instruction. More specifically, the processor may be configured to retrieve an encoded address from the processor stack or appropriate register for the associated implicit jump instruction. The processor may use the address transformation module 115 to apply a reverse transformation function to the encoded address to arrive at a decoded target address. The resulting decoded target or return address is then used in the execution flow of the application 110.

Figure 2B:
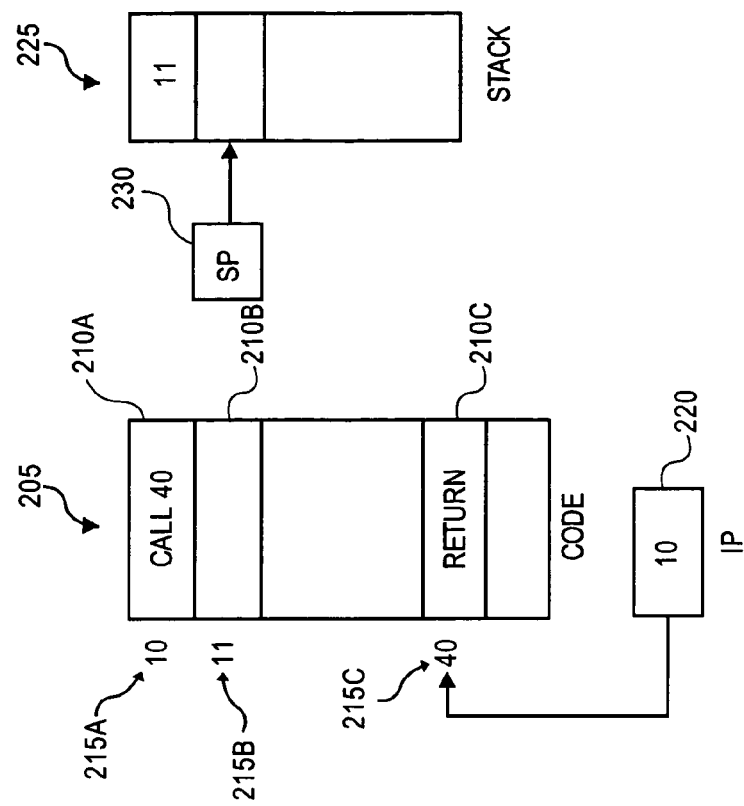
FIGS. 2A-C, collectively, illustrate a processor executing a jump instruction.
Figure 2A:
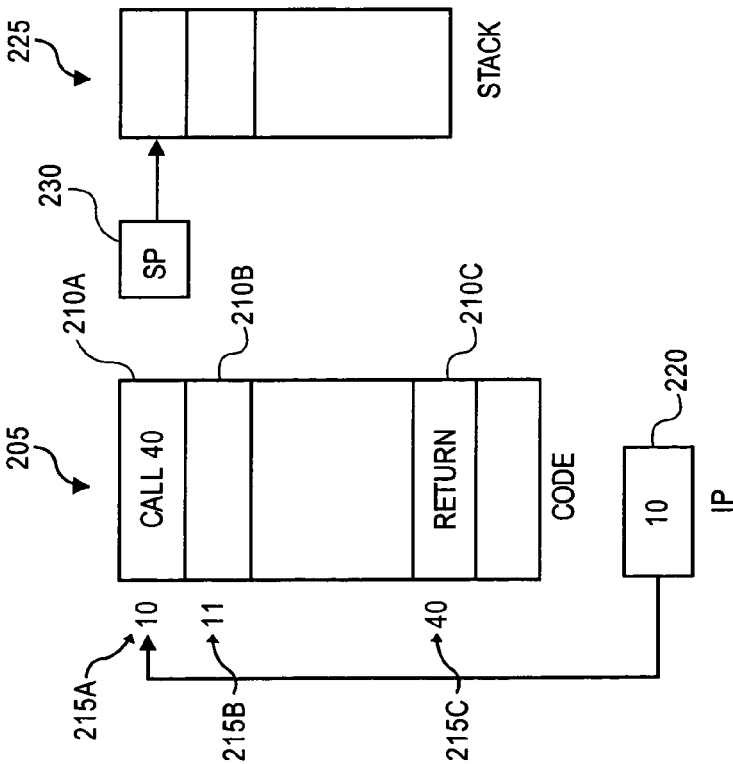
Figure 2C:
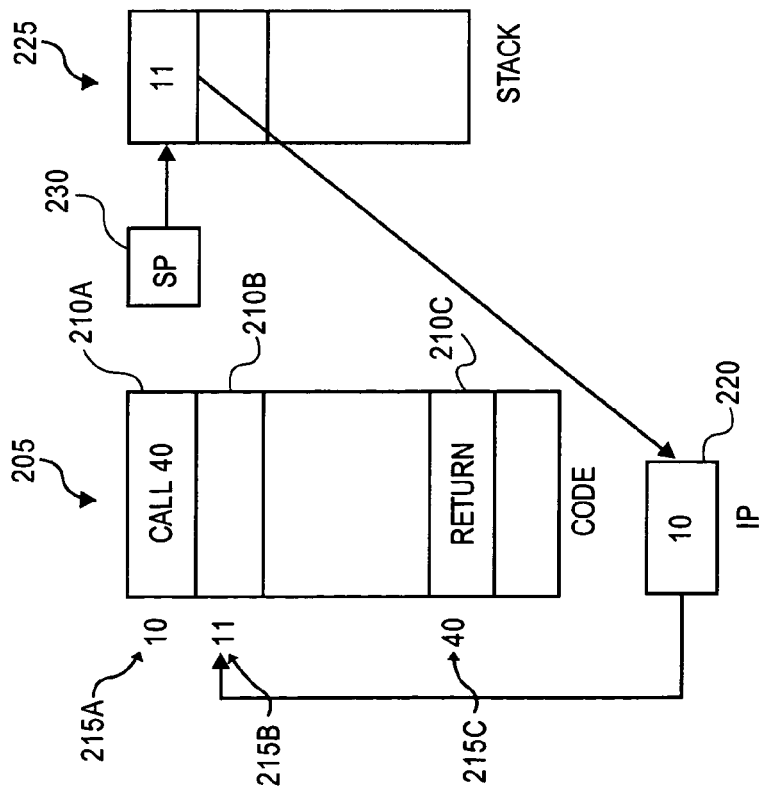

FIGS. 2A-C collectively illustrate a sequence of conventional processing of instructions in a processor, e.g., processor 105, in accordance with an embodiment. As shown in FIG. 2A, the processor 105 may be executing code 205, which is stored in a memory attached to the processor 105. The code 205 may be a machine code representation of the application 110. The code 205 may comprises individual instructions 210, which are stored in separate memory locations. Each memory location of the instructions 210 has an associated address 215, which allows referencing the memory location of the respective line of instruction.

Instruction pointer register 220 (labeled as IP in FIGS. 2A-C) may be configured to point to the instruction of the code 205 that is currently being executed. The IP register contains the memory address of the instruction being executed. During the execution of the current instruction, the contents of the IP is updated to correspond to the address of the next instruction to be executed. Typically, the IP 220 points to the instruction that is to be fetched from memory. The instruction addresses 215 may provide a mechanism of execution flow for the processor 105. Accordingly, FIG. 2A illustrates a case where the instruction pointer register 220 points to instruction reference 215A. The instruction 215A is a CALL command with an explicit target address, e.g., instruction address "40".

FIG. 2B illustrates the next step in the process. As the processor 105 executes the CALL instruction 215A, the instruction pointer 220 is updated with the next instruction address, i.e., address 40. The processor 105 may also be configured to save the next instruction reference on a processor stack 225 as pointed to by a stack pointer register 230. As shown in FIG. 2B, stack 225 contains in the location just above the cell pointed to by the stack pointer register 230 the address of the next instruction "11" for instruction 215B, which will be the next instruction to be executed by the processor 105 after it returns from the CALL instruction 215A. The instruction register 220 contains the instruction reference 215C "40", which is an RETURN instruction. When the processor 105 executes the RETURN instruction 210C, the processor 105 continues execution at the next instruction 210B in the original code sequence.

FIG. 2C illustrates the state of the processor 105 during execution of the instruction 215C, "RETURN". As shown in FIG. 2C, during the execution of instruction 215C, the instruction pointer 220 may be updated with the memory address of instruction 215B, which was saved in the stack 225. The stored value was "popped" off the stack 225, which adjusts the value of the stack pointer 230.

When the value is stored in the stack 225, the execution path may be considered vulnerable. More specifically, if an attacker is successful, one can overwrite this value, the jump or return may be redirected to a new location. Thus, the attacker may redirect the execution flow of the application 110.

Figure 3A:
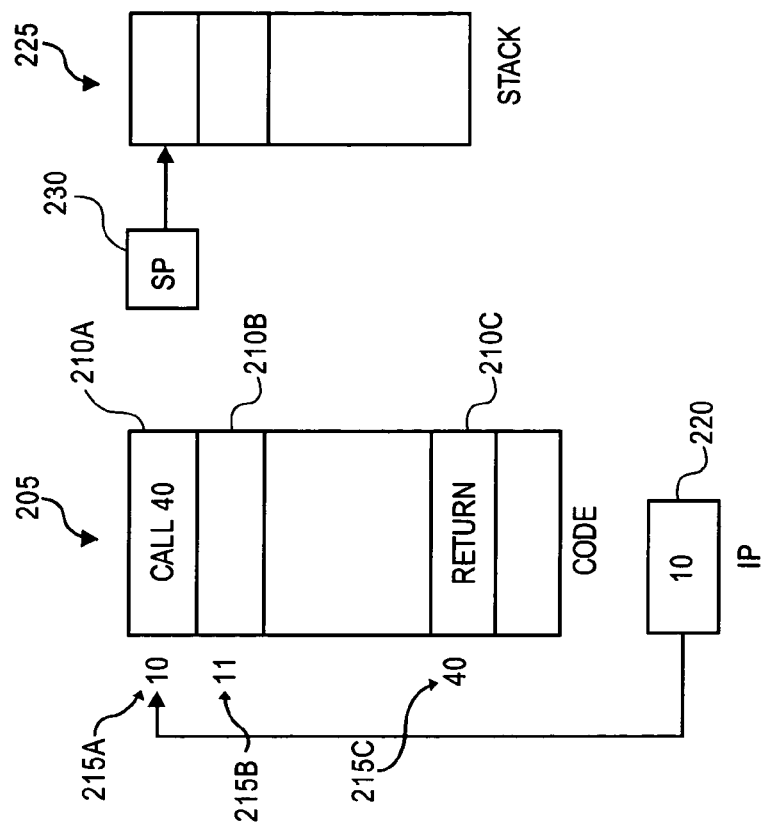
FIGS. 3A-C, collectively, illustrate a processor executing a jump instruction utilizing an embodiment of the address transformation module.
Figure 3C:
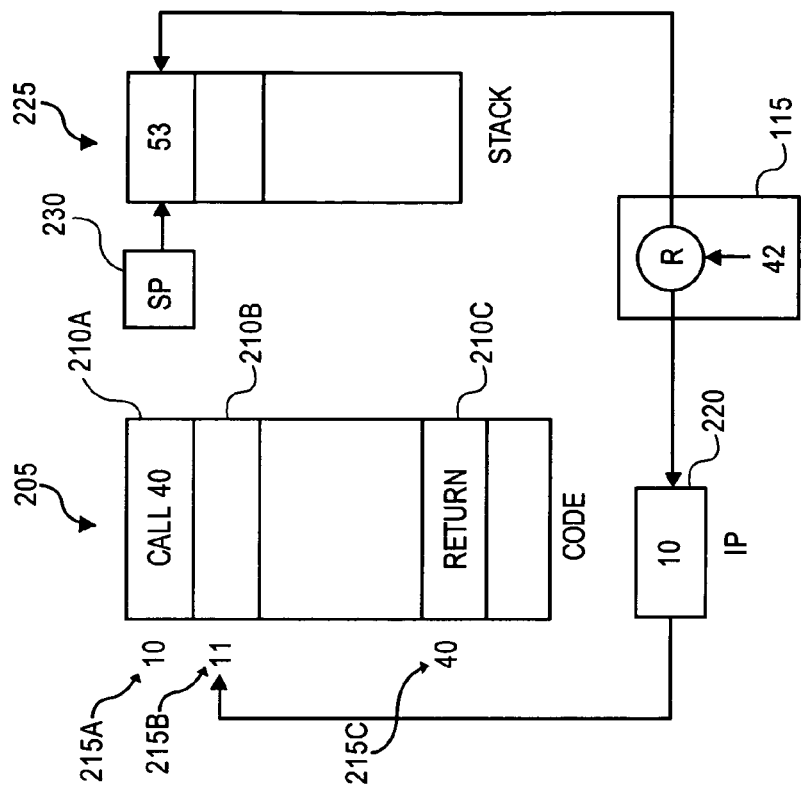
Figure 3B:
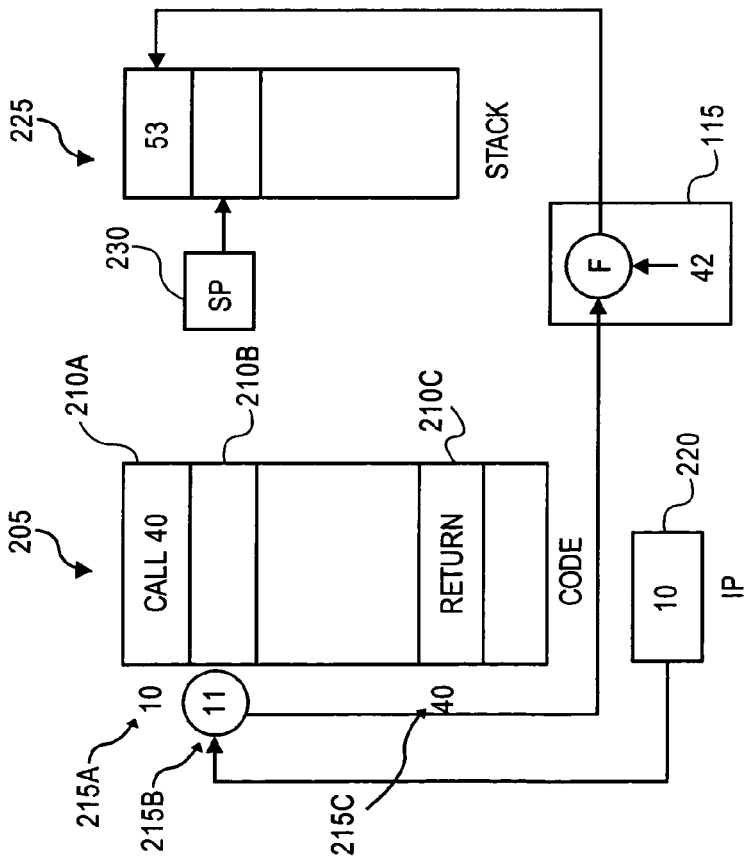

To combat attackers attacking at this vulnerability, an address transformation module 115 may be utilized to encode the target or return addresses of call (or branch) instructions. Once the memory address of the target or return address has been encoded, a potential attacker has a substantially smaller chance of overwriting the stored memory address with a desired value, which is illustrated in FIGS. 3A-C FIGS. 3A-C collectively illustrate the steps of processing of code 205 in an exemplary embodiment. As shown in FIG. 3A, the execution of the code 205 is similar to that of FIG. 2A. More particularly, the instruction pointer 220 points to the current instruction being executed, in this example, instruction 215A, CALL 40. The stack pointer 230 points at the first available location on the stack 225.

FIG. 3B depicts the next step in the sequence where the address transformation module 115 may be invoked. More particularly, when the instruction 215A is executed (a CALL instruction), the address transformation module 115 may be invoked to encode the address of the next instruction. In this example, a random value 42 may be added to the value of the address of instruction 215B (i.e., 42+11=53). The transformation "F" is an addition operation which is a reversible one-to-one transformation. In other embodiments, other reversible one-to-one transformations may be an XOR operation, rotate left or right operations, or other similar operations. In yet other embodiments, a list of reversible one-to-one transformations may be selected during instantiation of the application.

Returning to FIG. 3B, the resulting value "53" from the address transformation module 115 may be stored on the stack 225. Since the seed value on the address transformation module may be based on a random number generated during the instantiation of the application 110, all instances of the programs or applications can use different seed values and/or different transformation functions, thus increasing the security of an application executing on a processor by diversity.

FIG. 3C depicts the execution of the instruction 215C, the RETURN instruction, in accordance with an embodiment. As shown in FIG. 3C, during the execution of instruction 215C, RETURN instruction, the instruction register 220 may be loaded with the return address from the stack 225. Instead of using the return address directly, the processor 105 may invoke the address transformation module 115 to apply a reverse transformation "R" to the stored instruction address, in this example, subtracting 42. The result of the reverse transformation may then be loaded into the instruction pointer 220. The instruction following the instruction 215A at memory address 11 will be executed next. The execution control of the program has not changed but the value stored on the stack 225 has. This value is what attackers overwrite. To do this successfully with the transformation described hereinabove, the attacker would have to know the type of transformation function being applied for this instance of the application and the transformation seed value (in the example, 42). The odds of correctly determining the transformation seed value is up to one in $2^N$, where N may be the word-length of the processor (e.g., 32 or 64-bits).

It should be noted that not all currently available applications may be able to use the address transformation module. Accordingly, an implementation of the address transformation module may contain a mechanism to disable the address transformation module in order to ensure maximum backward compatibility. The transformation can be disabled altogether, for the application or process, or individual instructions.

Moreover, in some situations the transformation function and the seed (or input) values must not be opaque to the application 110. In some embodiments, the processor may be able to encode and decode the stored addresses explicitly. Therefore, it is at least necessary for the application to be able to request all the information used by the address transformation module. Accordingly, one embodiment may include adding processor instructions to query the information or by requiring the application to set up the transformation and its input value directly. Then, the application may definitely undo the operation. Alternatively, in other embodiments, the processor can provide an instruction which takes an address as the input, performs the transformation and returns the encoded result. Yes another embodiment might also provide an instruction for decoding an encoded address value.

Figure 4:
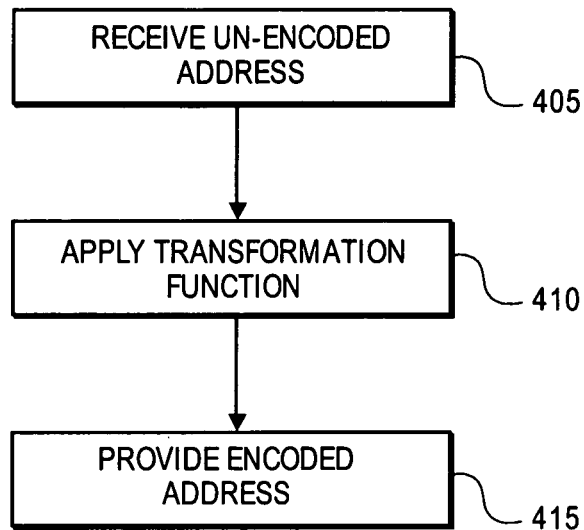
FIG. 4 illustrates an exemplary flow diagram in accordance with another embodiment.

FIG. 4 depicts a flow diagram 400 implemented by the address transformation module 115 in accordance with an embodiment. It should be readily obvious to one of ordinary skill in the art that existing steps may be modified and/or deleted and other steps added in FIG. 4.

As shown in FIG. 4, the address transformation module 115 may be configured to receive an address, in step 405. More particularly, a processor 105 may execute a call instruction. The call instruction may have a target address and implicitly generate a return address. The processor 105 may provide the return address to the address transformation module 115.

In step 410, the address transformation module 115 may be configured to apply the transformation function to the received address. The address transformation module 115 may have been seeded with a value, possibly based on a random number generator. The seed value may be generated during the instantiation of the application. In some embodiments, the address transformation module 115 may provide a selection of reversible one-to-one transformation functions. Transformation functions may also be selected during instantiation of the application.

In step 415, the address transformation module 115 may provide the transformed value, or encoded memory address, to the processor to be used.

Figure 5:
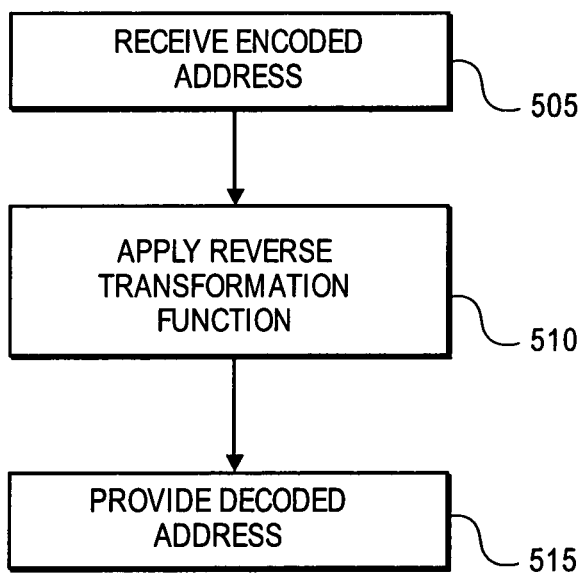
FIG. 5 illustrates another exemplary flow diagram in accordance with another embodiment.

FIG. 5 illustrates an exemplary flow diagram 500 implemented by the address transformation module 115 in accordance with another embodiment. As shown in FIG. 5, the address transformation module 115 may be configured to receive the encoded memory address, in step 505. More particularly, the processor 105 may be executing an instruction where an encoded instruction address may be stored in the instruction pointer. This can happen for encoded target addresses of jump and call instructions and for encoded return addresses in return instructions. The address transformation module 115 may be invoked to apply a reverse transformation.

In step 510, the address transformation module 115 may be configured to apply a reverse transformation function to the encoded memory address value. More specifically, the address transformation module 115 may apply the reverse of the selected transformation function to the encoded memory address value to arrive at the decoded memory address.

In step 515, the address transformation module 115 may provide the decoded memory address to the processor, for subsequent processing.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
executing, by a processor, code associated with an application comprising a first instruction and a second instruction;
selecting a transformation value and a reversible transformation function for the application such that all concurrently running applications have independent transformation values;
determining a memory location of the second instruction subsequent to the first instruction;
encoding, by the processor, the memory location of the second instruction with the selected transformation value and the reversible transformation function of the application; and
storing the encoded memory location of the second instruction, the processor to disable the reversible transformation function upon detection that the application is incompatible with the reversible transformation function.

2. The method of claim 1, wherein the reversible transformation function is based on a random number generated during a boot-up sequence.

3. The method of claim 1, wherein the first instruction is a jump instruction that takes a computed target address value.

4. The method of claim 1, wherein the first instruction is a call instruction comprising a static target address value.

5. The method of claim 1, further comprising:
detecting a third instruction designating a return target address;
retrieving the encoded memory location of the second instruction as the return target address; and
decoding the encoded memory location to determine the return target address.

6. The method of claim 5, wherein the decoding of the encoded memory location is based on the reversible transformation function.

7. The method of claim 6, wherein the reversible transformation function is based on a number randomly generated during a boot-up sequence.

8. The method of claim 1, wherein the reversible transformation function is based on a random number.

9. A non-transitory computer readable storage medium comprising executable code which, when executed by a processor, causes the processor to perform operations comprising:
detecting, by the processor, a first instruction of an application comprising an operand designating a target address;
selecting a transformation value and a reversible transformation function for the application such that all concurrently running applications have independent transformation values;
determining a memory location of a second instruction subsequent to the first instruction;
encoding, by the processor, the memory location of the second instruction with the selected transformation value and the reversible transformation function of the application; and
storing the encoded memory location of the second instruction, the processor to disable the reversible transformation function upon detection that the application is incompatible with the reversible transformation function.

10. A method comprising:
detecting a return instruction of an application that implicitly designates a return target address;
retrieving a memory location associated with the return target address, wherein the memory location is encoded by a reversible transformation function and a transformation value, wherein all concurrently running applications have independent transformation values; and
decoding, by a processor, the encoded memory location with the transformation value and the reversible transformation function of the application to determine the return target address,
wherein the processor disables the reversible transformation function upon detection that the application is incompatible with the reversible transformation function.

11. The method of claim 10, wherein the reversible transformation function is based on a random number generated during a boot-up sequence.

12. A system comprising:
a memory;
a processor coupled to the memory, the processor to:
execute code associated with an application comprising a first instruction and a second instruction,
select a transformation value and a reversible transformation function for the application such that all concurrently running applications have independent transformation values,
determine a memory location of the second instruction subsequent to the first instruction of the application,
encode the memory location of the second instruction with the selected transformation value and the reversible transformation function of the application,
store the encoded memory location of the second instruction, and
disable the reversible transformation function upon detection that the application is incompatible with the reversible transformation function.

13. The system of claim 12, wherein the reversible transformation function is based on a random number generated during a boot-up sequence.

14. The system of claim 12, wherein the first instruction is a jump instruction that takes a computed target address value.

15. The system of claim 12, wherein the first instruction is call instruction comprising a static target address value.

16. The system of claim 12, the processor to:
detect a third instruction that implicitly designates a return target address;
retrieve the encoded memory location of the second instruction as the return target address; and
decode the encoded memory location to determine the return target address.

17. The system of claim 16, wherein the decoding of the encoded memory location is based on the reversible transformation function.

18. The system of claim 16 wherein the reversible transformation function maps one value onto another value.

19. The system of claim 12, the processor to:
detect a fourth instruction that explicitly designates a target address;
retrieve the encoded memory location of the second instruction; and
decode the encoded memory location to determine the return target address.

20. The system of claim 19, wherein the decoding of the encoded memory location is based on the reversible transformation function.

21. A method comprising:
    detecting a return instruction of an application designating a return target address;
    retrieving a memory location associated with the return target address, wherein the memory location is encoded by a reversible transformation function and a transformation value, wherein all concurrently running applications have independent transformation values; and
    decoding, by a processor, the encoded memory location with the transformation value and the reversible transformation function of the application to determine the return target address, wherein the processor disables the reversible transformation function upon detection that the application is incompatible with the reversible transformation function.

22. The method of claim 21, wherein the reversible transformation function is based on a random number generated during a boot-up sequence.

23. A non-transitory computer readable storage medium comprising instructions to cause a processor to perform operations comprising:
    detecting, by the processor, a return instruction of an application designating a return target address;
    retrieving a memory location associated with the return target address, wherein the memory location is encoded by a reversible transformation function and a transformation value, wherein all concurrently running applications have independent transformation values; and
    decoding the encoded memory location with the transformation value and the reversible transformation function of the application to determine the return target address, the processor to disable the reversible transformation function upon detection that the application is incompatible with the reversible transformation function.

\* \* \* \* \*